US009755973B2

(12) United States Patent
Testicioglu et al.

(10) Patent No.: US 9,755,973 B2
(45) Date of Patent: Sep. 5, 2017

(54) PERFORMING QOS ON UNKNOWN BANDWIDTHS THROUGH RATE ESTIMATING TCP CONGESTION HANDLERS

(71) Applicant: Citrix Systems, Inc., Fort Lauderdale, FL (US)

(72) Inventors: Mustafa Kutluk Testicioglu, Mountain View, CA (US); Seth K. Keith, Scotts Valley, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 219 days.

(21) Appl. No.: 13/961,850

(22) Filed: Aug. 7, 2013

(65) Prior Publication Data

US 2015/0043345 A1    Feb. 12, 2015

(51) Int. Cl.
| | |
|---|---|
| *H04L 12/801* | (2013.01) |
| *H04L 12/927* | (2013.01) |
| *H04W 72/08* | (2009.01) |
| *H04L 12/851* | (2013.01) |
| *H04L 12/825* | (2013.01) |

(52) U.S. Cl.
CPC ............. *H04L 47/11* (2013.01); *H04L 47/24* (2013.01); *H04L 47/25* (2013.01); *H04L 47/805* (2013.01); *H04W 72/087* (2013.01)

(58) Field of Classification Search
CPC ......... H04L 47/25; H04L 47/24; H04L 47/11; H04L 47/805; H04W 72/087
See application file for complete search history.

(56) References Cited

U.S. PATENT DOCUMENTS

| | | | |
|---|---|---|---|
| 6,122,254 A * | 9/2000 | Aydemir ................ | H04L 47/10 370/235 |
| 8,433,783 B2 | 4/2013 | Jackowski et al. | |
| 2004/0001691 A1* | 1/2004 | Li .......................... | H04L 47/10 386/213 |
| 2004/0165588 A1* | 8/2004 | Pandya ........................ | 370/389 |
| 2006/0026004 A1* | 2/2006 | Van Nieuwenhuizen ...... | H04L 12/14 709/233 |

(Continued)

FOREIGN PATENT DOCUMENTS

WO    WO 2012/175117 A1    12/2012

OTHER PUBLICATIONS

International Search Report and Written Opinion dated Nov. 12, 2014; International Application No. PCT/US2014/050016; 11 pages.

(Continued)

*Primary Examiner* — Ajay Cattungal
(74) *Attorney, Agent, or Firm* — Finnegan, Henderson, Farabow, Garrett & Dunner LLP

(57) ABSTRACT

A system and method is provided for scheduling data packets. The system includes one or more packet engines configured to provide one or more congestion indications for a plurality of connections of a communication link. The system also includes a packet scheduler configured to receive the one or more congestion indications, estimate a link rate of the communication link using the one or more congestion indications and classification information, and schedule the data packets for transmission via the plurality of connections using the estimated link rate and the classification information.

21 Claims, 10 Drawing Sheets

(56) References Cited

U.S. PATENT DOCUMENTS

| | | | |
|---|---|---|---|
| 2006/0126509 A1* | 6/2006 | Abi-Nassif | H04L 47/10 370/235 |
| 2011/0090797 A1* | 4/2011 | Beecroft | H04L 45/125 370/237 |
| 2013/0165084 A1* | 6/2013 | Xu | H04W 4/003 455/414.1 |
| 2013/0166623 A1* | 6/2013 | Stanwood | H04W 4/00 709/202 |
| 2013/0208671 A1* | 8/2013 | Royz et al. | 370/329 |
| 2013/0286879 A1* | 10/2013 | ElArabawy | H04N 21/26208 370/252 |
| 2013/0290492 A1* | 10/2013 | ElArabawy | H04L 65/80 709/219 |
| 2013/0298170 A1* | 11/2013 | ElArabawy | H04W 28/0231 725/62 |
| 2014/0153392 A1* | 6/2014 | Gell | H04W 28/0236 370/230 |
| 2014/0155043 A1* | 6/2014 | Gell | H04W 4/003 455/414.1 |

OTHER PUBLICATIONS

Capone, A. et al.; "Bandwidth Estimation Schemes for TCP Over Wireless Networks"; IEEE Transactions on Mobile Computing; vol. 3, No. 2; Apr.-Jun. 2004; pp. 129-143.

Gerla, M. et al.; "TCP Westwood with adaptive bandwidth estimation to improve efficiency/friendliness tradeoffs"; Computer Communications; vol. 27, No. 1; Jan. 1, 2004; pp. 41-58.

Yang, H. et al.; "An End-to-End Congestion Control Approach Based-on Content-Aware"; International Journal of Multimedia and Ubiquitous Engineering; vol. 4, No. 2; Apr. 2, 2009; pp. 81-90.

* cited by examiner

PERFORMING QOS ON UNKNOWN BANDWIDTHS THROUGH RATE ESTIMATING TCP CONGESTION HANDLERS

FIELD

The present disclosure generally relates to quality control of data communication networks. Exemplary embodiments relate to methods and systems for providing Quality-of-Service (QoS) flow control for communication links with unknown, unreliable, or un-updated bandwidth.

BACKGROUND

QoS techniques are often used at a communication link in order to control that link's bottleneck bandwidth. These bottlenecks can sometimes occur at fast-to-slow transitions in network speed, for example at a device bridging a Local Area Network (LAN) and a Wide Area Network (WAN). Due to different network speeds at such transitions, a backlog of data packets corresponding to different connections of the communication link can be created at the bottlenecks. Using QoS techniques, the device at a bottleneck can make a decision about which connections can have a data packet sent next. That is, the device can use QoS techniques to schedule the data packets received through one or more connections for sending over the communication link. The bandwidth information of a communication link, however, may not always be available, reliable, or updated. As an example, the bandwidth of a communication link in a cloud network environment may not be available. As another example, the bandwidth of a wireless communication link may change frequently, and thus a previously known bandwidth of the wireless communication link may not be reliable or updated. Under these circumstances, current QoS techniques may not be able to assign priorities to the connections or determine the fairness for sending data packets received through various connections.

BRIEF DESCRIPTION OF THE DRAWINGS

Reference will now be made to the accompanying drawings showing example embodiments of this disclosure. In the drawings.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

The embodiments described herein provide network traffic optimization techniques, such as QoS packet scheduling techniques, when the link rate of a communication link is unknown, unreliable, or not updated. The network traffic optimization techniques described herein can estimate a link rate of a communication link for sending data packets received from a plurality of connections, and thus can schedule the data packets based on the estimated link rate by, e.g., assigning priorities to the plurality of connections of the communication link.

Figure 1:
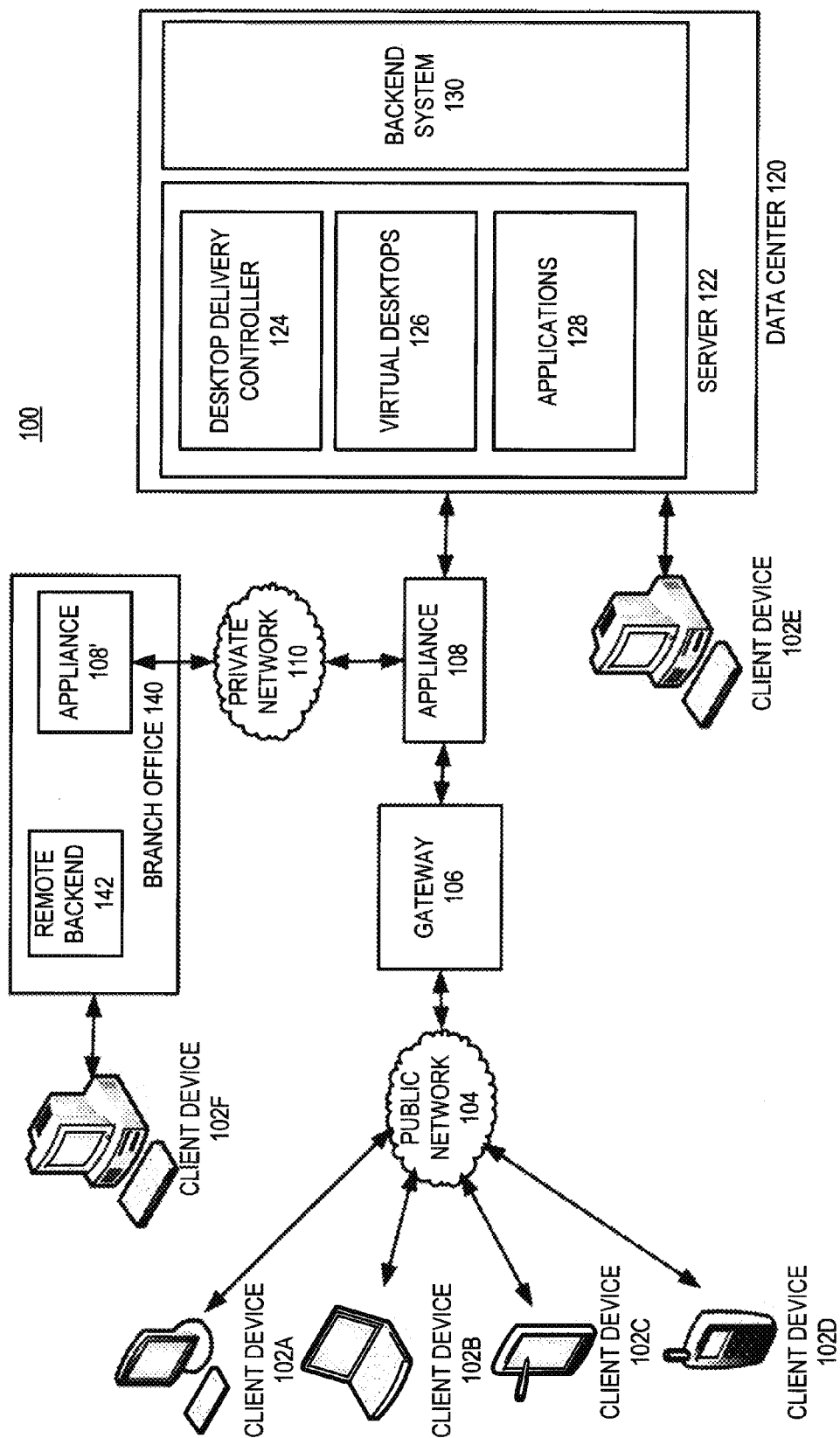
FIG. 1 is a block diagram of an exemplary network environment, consistent with embodiments of the present disclosure.

FIG. 1 is a block diagram of an exemplary network environment 100. While exemplary network environment 100 is directed to a virtual network environment, it is appreciated that the network environment can be any type of network that communicates using packets. Network environment 100 can include one or more client devices 102, a public network 104, a gateway 106, an appliance 108, a private network 110, a data center 120, and a branch office 140.

One or more client devices 102 are devices that can acquire remote services from data center 120 through various means. Client devices 102 can communicate with data center 120 either directly (e.g., client device 102e) or indirectly through a public network 104 (e.g., client devices 102a-d) or a private network 110 (e.g., client device 102O). When client device 102 communicates through public network 104 or private network 110, a communication link can be established. For example, a link can be established by public network 104, gateway 106, and appliance 108, thereby providing a client device (e.g. client devices 102a-d) access to data center 120. A link can also be established by branch office 140 including appliance 108', private network 110, and appliance 108, thereby providing a client device (e.g. client device 102l) access to data center 120. While client devices 102 are portrayed as a computer (e.g., client devices 102a, 102e, and 102f), a laptop (e.g., client device 102b), a tablet (e.g., client device 102c), and a mobile smart phone (e.g., client device 102d), it is appreciated that client device 102 could be any type of device that communicates packets to and from data center 120.

Public network 104 and private network 110 can be any type of network such as a wide area network (WAN), a local area network (LAN), or a metropolitan area network (MAN). As an example, a WAN can be the Internet or the World Wide Web, and a LAN can be a corporate Intranet. Public network 104 and private network 110 can be a wired network or a wireless network.

Gateway 106 is a physical device or is software that is part of a physical device that interfaces between two networks having different protocols. Gateway 106, for example, can be a server, a router, a host, or a proxy server. In some embodiments, gateway 106 can include or be coupled to a firewall separating gateway 106 from public network 104 (e.g., Internet). Gateway has the ability to modify signals received from client device 102 into signals that appliance 108 and/or data center 120 can understand and vice versa.

Appliance 108 is a device that optimizes WAN traffic by including, for example, a QoS packet scheduler. In some embodiments, appliance 108 optimizes other types of network traffic, such as local area network (LAN) traffic, metropolitan area network (MAN) traffic, or wireless network traffic. Appliance 108 can optimize network traffic by, for example, scheduling data packets in an established communication link so that the data packets can be transmitted or dropped at a scheduled time and rate. In some embodiments, appliance 108 is a physical device, such as Citrix System's Branch Repeater, Netscaler, or CloudBridge. In some embodiments, appliance 108 can be a virtual appliance. In some embodiments, a first appliance (e.g., appliance 108) works in conjunction with or cooperation with a second appliance (e.g., appliance 108') to optimize network traffic. For example, the first appliance can be located between the WAN and a corporate LAN (e.g., data center 120), while the second appliance can be located between a branch office (e.g., branch office 140) and a WAN connection. In some embodiments, the functionality of gateway 106 and appliance 108 can be located in a single physical device. Appliances 108 and 108' can be functionally the same or similar. Appliance 108 is further described below corresponding to FIG. 4.

Data center 120 is a central repository, either physical or virtual, for the storage, management, and dissemination of data and information pertaining to a particular public or private entity. Data center 120 can be used to house computer systems and associated components, such as one or physical servers, virtual servers, and storage systems. Data center 120 can include, among other things, one or more servers (e.g., server 122) and a backend system 130. In some embodiments data center 120 can include gateway 106, appliance 108, or a combination of both.

Server 122 is an entity represented by an IP address and can exist as a single entity or a member of a server farm. Server 122 can be a physical server or a virtual server. In some embodiments, server 122 can include a hardware layer, an operating system, and a hypervisor creating or managing one or more virtual machines. Server 122 provides one or more services to an endpoint. These services include providing one or more applications 128 to one or more endpoints (e.g., client devices 102a-f or branch office 140). For example, applications 128 can include Windows™- or SAP™-based applications and computing resources.

Desktop delivery controller 124 is a device that enables delivery of services, such as virtual desktops 126 to client devices (e.g., client devices 102a-f or branch office 140). Desktop delivery controller 124 provides functionality required to manage, maintain, and optimize all virtual desktop communications. In some embodiments, desktop delivery controller 124 can control, manage, maintain, or optimize the provisioning of applications 128.

In some embodiments, the services include providing one or more virtual desktops 126 that can provide one or more applications 128. Virtual desktops 126 can include hosted shared desktops allowing multiple user to access a single shared Remote Desktop Services desktop, virtual desktop infrastructure desktops allowing each user to have their own virtual machine, streaming disk images, a local virtual machine, individual applications (e.g., one or more applications 128), or a combination thereof.

Backend system 130 is a single or multiple instances of computer networking hardware, appliances, or servers in a server farm or a bank of servers and interfaces directly or indirectly with server 122. For example, backend system 130 can include Microsoft™ Active Directory, which can provide a number of network services, including lightweight directory access protocol (LDAP) directory services, Kerberos-based authentication, domain name system (DNS) based naming and other network information, and synchronization of directory updates amongst several servers. Backend system 130 can also include, among other things, an Oracle backend server, a SQL Server backend, and/or a dynamic host configuration protocol (DHCP). Backend system 130 can provide data, services, or a combination of both to data center 120, which can then provide that information via varying forms to client devices 102 or branch office 140.

Branch office 140 is part of a local area network (LAN) that is part of the WLAN having data center 120. Branch office 140 can include, among other things, appliance 108' and remote backend 142. In some embodiments, appliance 108' can sit between branch office 140 and private network 110. As stated above, appliance 108' can work with appliance 108. Remote backend 142 can be set up in similar manner as backend system 130 of data center 120. Client device 102f can be located on-site to branch office 140 or can be located remotely from branch office 140.

Figure 2A:
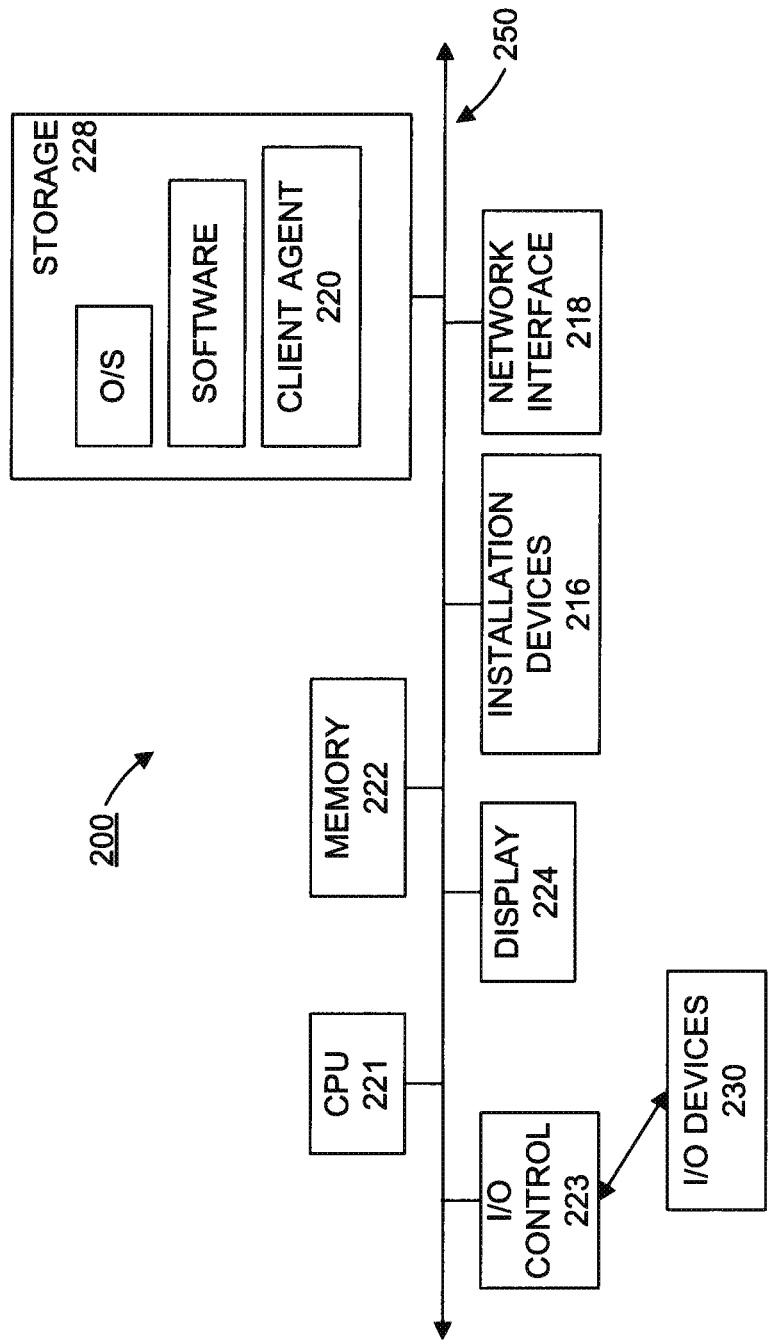
FIGS. 2A-2B are block diagrams of an exemplary computing device, consistent with embodiments of the present disclosure.
Figure 2B:
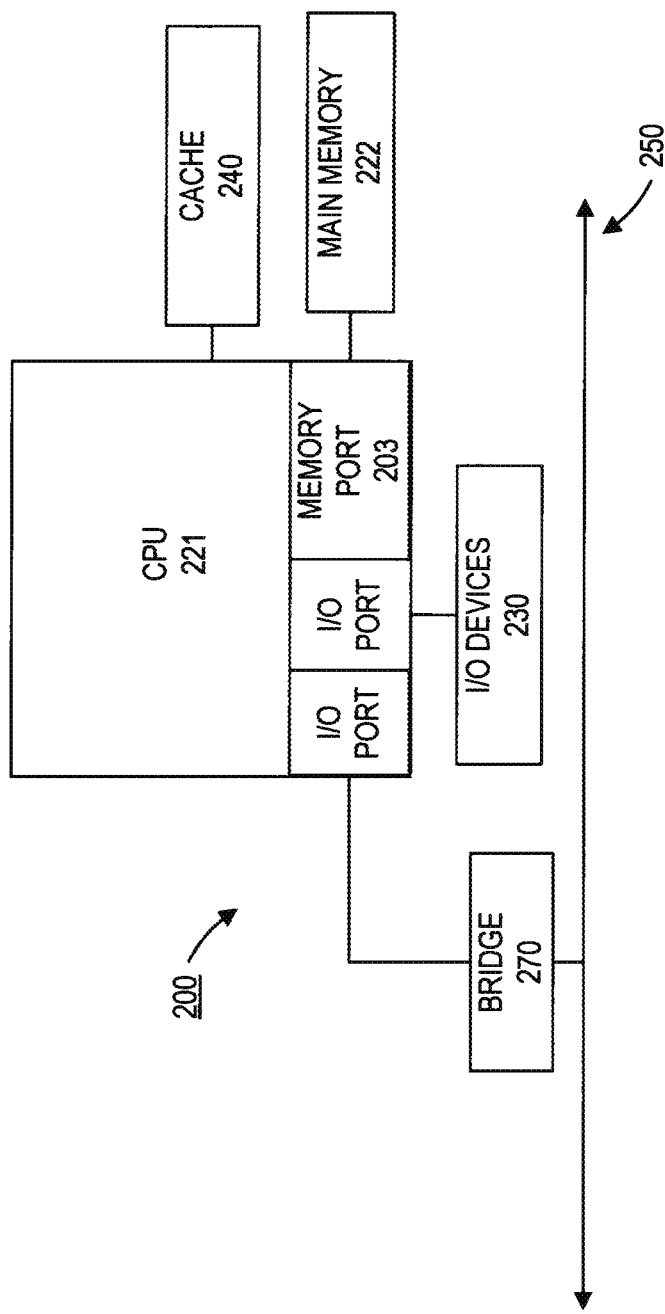

Appliances 108 and 108' and gateway 106 can be deployed as or executed on any type and form of computing device, such as a computer or networking devices capable of communicating on any type and form of network described herein. As shown in FIGS. 2A-2B, each computing device 200 includes a central processing unit (CPU) 221 and a main memory 222. CPU 221 can be any logic circuitry that responds to and processes instructions fetched from the main memory 222. CPU 221 can be a single or multiple microprocessors, field-programmable gate arrays (FPGAs), or digital signal processors (DSPs) capable of executing particular sets of instructions stored in a memory (e.g., main memory 222) or cache (e.g., cache 240). The memory includes a tangible non-transitory computer-readable medium, such as a flexible disk, a hard disk, a CD-ROM (compact disk read-only memory), MO (magneto-optical) drive, a DVD-ROM (digital versatile disk read-only memory), a DVD-RAM (digital versatile disk random-access memory), or a semiconductor memory. Main memory 222 can be one or more memory chips capable of storing data and allowing any storage location to be directly accessed by CPU 221. Main memory 222 can be any type of random access memory (RAM), or any other available memory chip capable of operating as described herein. In the exemplary embodiment shown in FIG. 2A, CPU 221 communicates with main memory 222 via a system bus 250. Computing device 200 can also include a visual display device 224 and an input/output (I/O) device 230 (e.g., a keyboard, mouse, or pointing device) connected through I/O controller 223, both of which communicate via system bus 250. One of ordinary skill in the art would appreciate that CPU 221 can also communicate with memory 222 and other devices in manners other than through system bus 250, such as through serial communication manners or point-to-point communication manners. Furthermore, I/O device 230 can also provide storage and/or an installation medium for the computing device 200.

FIG. 2B depicts an embodiment of an exemplary computing device 200 in which CPU 221 communicates directly with main memory 222 via a memory port 203. CPU 221 can communicate with a cache 240 via a secondary bus, sometimes referred to as a backside bus. In some other embodiments, CPU 221 can communicate with cache 240 via system bus 250. Cache 240 typically has a faster response time than main memory 222. In some embodiments, such as the embodiment shown in FIG. 2B, CPU 221 can communicate directly with I/O device 230 via an I/O port. In further embodiments, I/O device 230 can be a bridge 270 between system bus 250 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

As shown in FIG. 2A, computing device 200 can support any suitable installation device 216, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive; or any other device suitable for installing software and programs such as any client agent 220, or portion thereof. Computing device 200 can further comprise a storage device 228, such as one or more hard disk drives or redundant arrays of independent disks, for storing an operating system and other related software, and for storing application software programs such as any program related to client agent 220. Optionally, any of the installation devices 216 could also be used as storage device 228.

Furthermore, computing device 200 can include a network interface 218 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 218 can comprise a built-in network adapter, network interface card, PCMCIA network card, card bus network adapter, wireless network adapter, USB network adapter, modem or any other device suitable for interfacing computing device 200 to any type of network capable of communication and performing the operations described herein.

Figure 3:
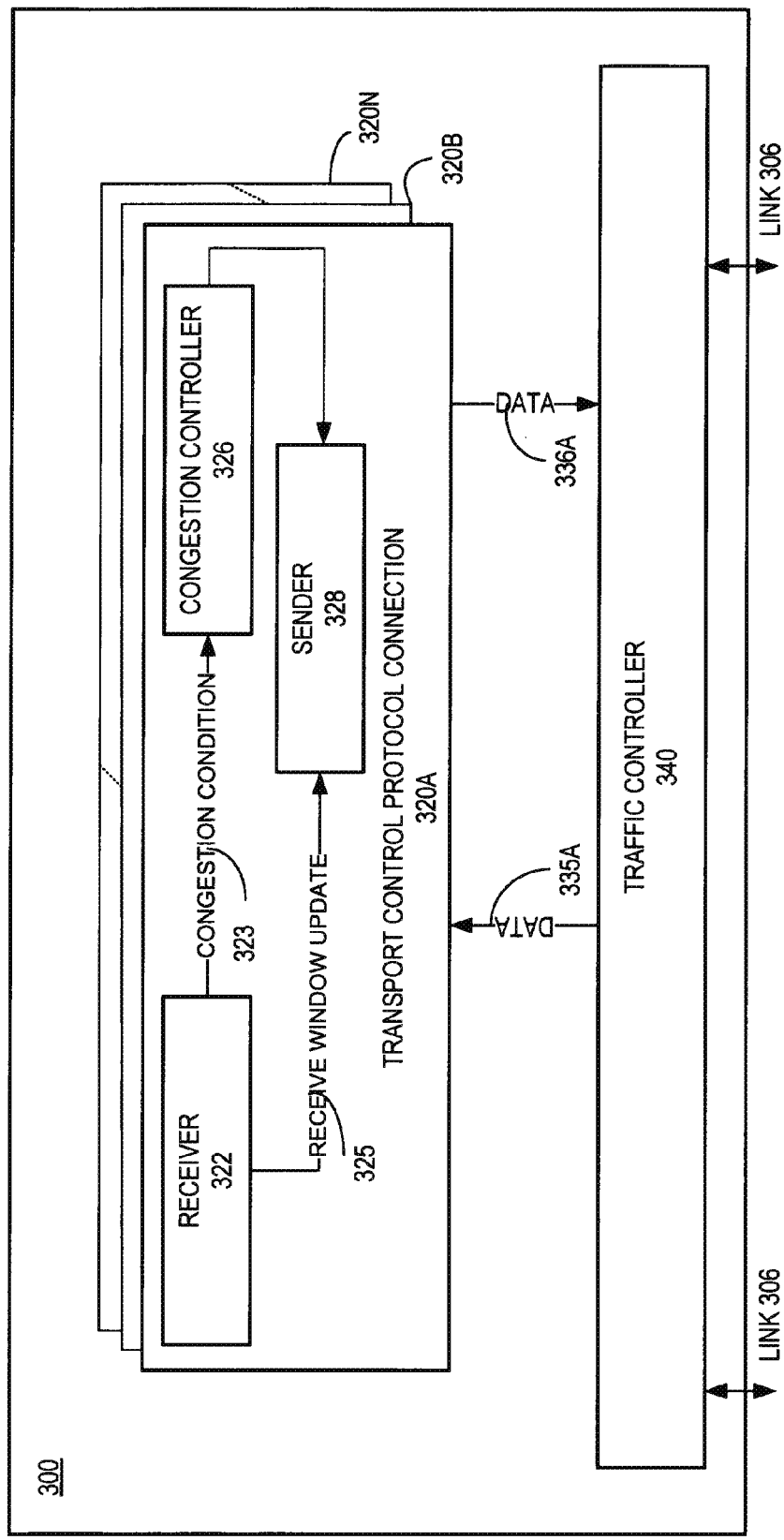
FIG. 3 is a block diagram of an exemplary prior art device.

FIG. 3 is a block diagram of an exemplary prior art device 300. Device 300 can include one or more transport control protocol connections 320A-N and a traffic controller 340. Device 300 can process data packets received via one or more TCP connections 320A-N. Device 300 can also include traffic controller 340. Traffic controller 340 can be a WAN traffic controller that directs data packets (e.g., 335A and 336A) received via TCP connections 320A-N over a communication link, such as communication link 306.

Data packets received via one or more TCP connections 320A-N can be processed by functional units including a receiver 322, a congestion controller 326, and a sender 328. Receiver 322 can receive data packets 335A from traffic controller 340. As an example, receiver 322 can receive a data packet comprising a TCP segment in a TCP connection (e.g., TCP connection 320A). A TCP segment comprises a header section and a data (payload) section. The header section can include a receive window size field, an ACK sequence number, and a number of indications, which can be used to indicate events (e.g., packet loss or packet delay) related to data communications and network congestions.

A TCP connection can use a sliding window flow control protocol to avoid having a remote sender (not shown) send data too fast for a receiver, such as receiver 322, to receive and process it reliably. For example, if device 300 represents a mobile device communicating via wireless communication links, it may have a lower bandwidth than a remote sender, which can be a server. Therefore, device 300 must regulate the data flow so as not be overwhelmed by the data packets sent by the remote sender. To regulate the data flow, receiver 322 can specify in the receive window size field the amount of additionally received data, e.g., in bytes, that it is willing to buffer for a connection, such as TCP connection 320A. Receiver 322 can send the receive window size in a receive window update 325 to sender 328 (local sender), which can then inform the remoter sender to slow down. When receiver 322 specifies a window size of 0, the remote sender stops sending more data packets to receiver 322.

In addition to the receive window size, a TCP header section can also include indications that indicate events related to data communications and network congestions. For example, a TCP header section can include an ACK flag, an ACK sequence number, and an Explicit Congestion Notification Echo (ECE) flag. While these indications are described here, other indications may be implemented in variations of TCP and other network protocols that are applicable to the systems and methods described herein, including the TCP implementations specified in RFC 793, RFC 1122, and specifically RFC 2581 and RFC 3168 relating to congestion control and avoidance described herein.

In some of these and other implementations, an ACK flag can be set to indicate receiving of a prior data packet. When the ACK flag is set, the ACK sequence number field indicates the next sequence number that the receiver is expecting. An ECE flag can be used to notify the packet recipient, e.g., receiver 322 for TCP connection 320A, that network congestion is occurring. The packet recipient can then elect to slow down the rate of transmission or adopt any other congestion control or avoidance techniques. The ECE flag can also be used in combination with other signaling bits, which negotiate with a packet recipient whether Explicit Congestion Notification (ECN) is supported. Any bits in any protocol used in the negotiation or signaling of explicit congestion can be referred to as ECN bits.

Referring to FIG. 3, in receiving one or more data packets 335A, receiver 322 can also receive one or more congestion indications, which can comprise any notification that communicates network congestion or allows an inference of potential network congestion to be drawn. Congestion indications can include, for example, indications of dropped packets, indications of delayed packets, indications of corrupted packets, and explicit congestion indications. In a TCP connection, for example, congestions may be indicated in TCP segments that comprises duplicate acknowledgements (ACKs) or lack of ACKs, and TCP segments comprising marked ECN flags.

After receiver 322 receives congestion indications, it sends the congestion indications to congestion controller 326. Congestion controller 326 can control the entry of data packets into the connection in order to alleviate or avoid congestion. Congestion controller 326 can use any congestion control mechanism to control the entry of data packets into the connection in order to alleviate or avoid congestion. For example, congestion controller 326 can estimate a connection rate, e.g., a connection bandwidth, and limit or update the rate that sender 328 transmits data packets.

In FIG. 3, device 300 performs congestion control with respect to each of TCP connections 320A-N on an individual connection basis. That is, when the bandwidth of a communication is unknown, unreliable, or not updated, device 300 can only perform congestion control with respect to each individual connection, but not with respect to the communication link, which can include one or more connections, such as a plurality of TCP connections 320A-N. As a result, a connection may be slowed down undesirably simply because the connection has many congestion indications. For example, a time-sensitive VoIP connection through a wireless mobile device may have many dropped packets or delayed packets, and thus may be undesirably slowed down by a congestion controller of the VoIP connection. Meanwhile, a time-insensitive TCP connection transferring a large webpage may have less congestion indications and thus may be undesirably given a higher bandwidth by its congestion controller. Moreover, some communication protocols, such as UDP, may not provide any congestion control and thus congestion indications of these protocols may not be available at all.

Figure 4:
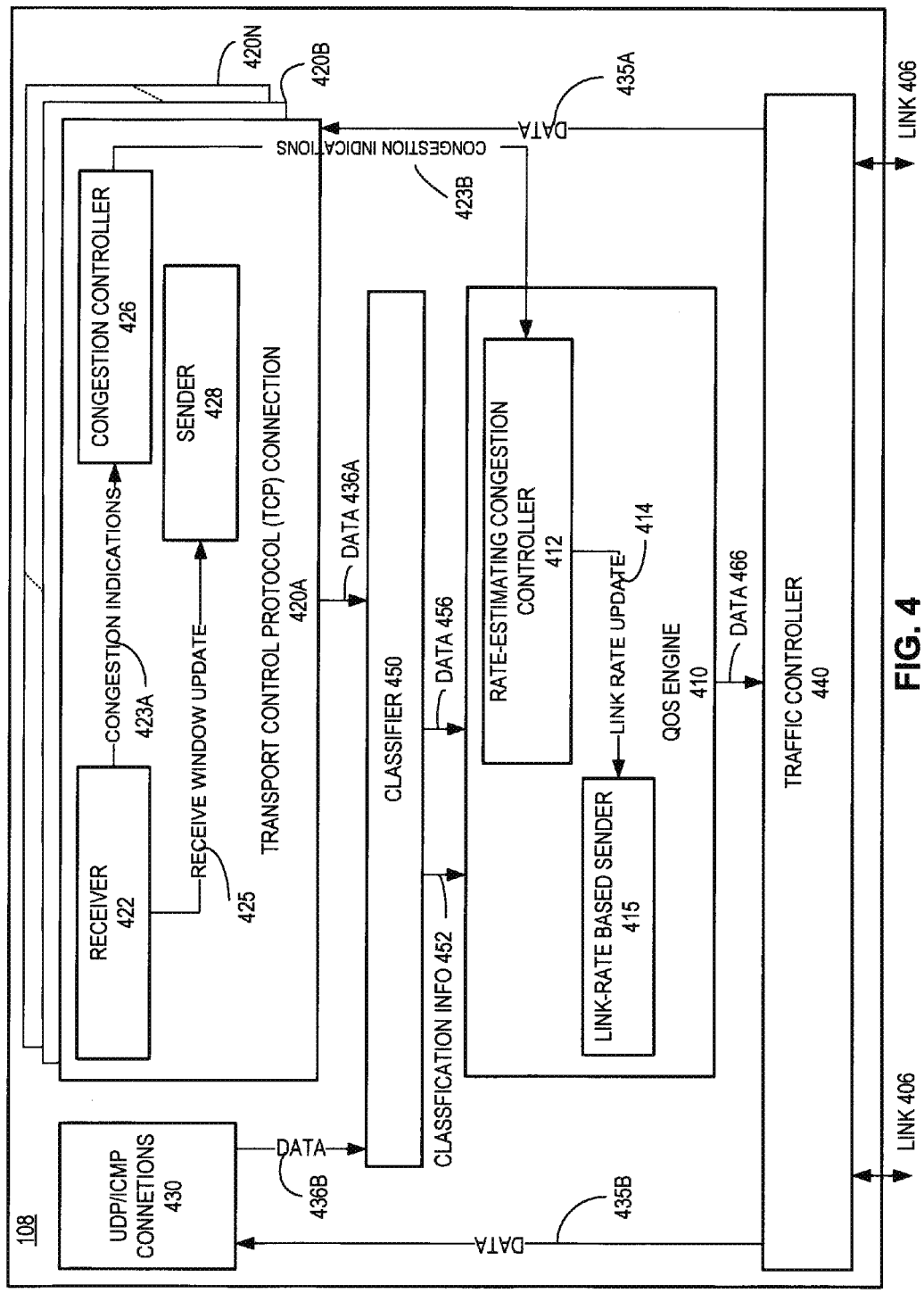
FIG. 4 is a block diagram of an exemplary appliance illustrated in FIG. 1, consistent with embodiments of the present disclosure.

FIG. 4 is a block diagram of an exemplary appliance 108 illustrated in FIG. 1, consistent with embodiments of the present disclosure. Similar to device 300 shown in FIG. 3, appliance 108 can include one or more packet engines (not shown) that can process data packets transmitted via one or more connections such as one or more TCP connections 420A-N and one or more UDP/ICMP connections 430. Appliance 108 can also include traffic controller 440. While FIG. 4 uses TCP connections 420A-N and UDP/ICMP connections 430 as illustrations, one or more packet engines can also process data packets transmitted via any other communication protocols including Stream Control Transmission Protocol (SCTP) and Datagram Congestion Control Protocol (DCCP). Appliance 108 can also include a QoS engine 410 and a classifier 450.

Traffic controller 440 can be a WAN traffic controller that can direct various network traffics via communication link 406 to TCP connections 420A-N and UDP/ICMP connections 430. For example, traffic controller 440 can direct various network traffics via communication link 406 by forwarding data packets 435A to one or more TCP connections 420A-N, and forwarding data packets 435B to UDP/ICMP connections 430. Network traffic via communication link 406 directed by traffic controller 440 can include Internet Protocol Security (IPsec) based traffic, generic routing encapsulation (GRE) traffic, VPN, HTTP, Voice-over-IP (VoIP), remote desktop protocol traffic, and any other types of traffic. Data packets 435A and 435B directed by traffic controller 440 can be routed to and processed by the one or more packet engines corresponding to TCP connections 420A-N and UDP/ICMP connections 430. Additionally, traffic controller 440 can also receive data packets 466 from QoS engine 410 and transmit data packets 466 via communication link 406.

Similar to those in FIG. 3, data packets received via one or more TCP connections 420A, and similarly TCP connections 420B-N can be processed by functional units including receiver 422, congestion controller 426, and sender 428. Receiver 422 can also receive data packets 435A from traffic controller 440. TCP connections 420A-N can also use a sliding window flow control protocol. Unlike congestion controller 326, congestion controller 426 may not limit the sending of packets by calculating and applying a congestion window. Instead, congestion indications can be used for estimating a link rate of the communication link. The estimated link rate can be used by a QoS engine, such as QoS engine 410, together with the assigned priorities of the plurality of the connections of the communications link. Details will be further described below.

Receiver 422 can also receive one or more congestion indications 423A, which can comprise any notification that communicates network congestion or allows an inference of potential network congestion to be drawn. Congestion indications can include, for example, indication of dropped packets, indications of delayed packets, indications of corrupted packets, and explicit congestion indications. In a TCP connection, for example, congestions may be indicated in TCP segments that comprise duplicate acknowledgements (ACKs) or lack of ACKs, and TCP segments comprising marked ECN flags.

After receiver 422 receives congestion indications 423A, it can send one or more congestion indications 423A to congestion controller 426. Unlike congestion controller 326 of device 300 shown in FIG. 3, in FIG. 4, congestion controller 426 of appliance 108 may not perform congestion control on an individual connection basis and instead can provide one or more congestion indications 423 corresponding to a particular TCP connection to rate-estimating congestion controller 412 of QoS engine 410. In some embodiments, one or more congestion indications 423B provided by congestion controller 426 can be different from congestion indications 423A provided by receiver 422. Similarly, congestion controllers of other TCP connections 420B-N can also provide their congestion indications to rate-estimating congestion controller 412 of QoS engine 410. While connections 420A-N use TCP as an example, it would appreciate that connections 420A-N can also be implemented with any other protocols providing congestion control, such as transport layer protocols including Stream Control Transmission Protocol (SCTP) and Datagram Congestion Control Protocol (DCCP).

In some embodiments, in addition to sending one or more congestion indications 423 to rate-estimating congestion controller 412 of QoS engine 410, TCP connections 420A-N can also transmit data packets 436A to classifier 450. Data packets 436A can be data packets or information about the data packets for scheduling the transmission of the data packets out of communication link 406. Similarly, UDP/ICMP connections 430 can also transmit data packets 436B or information about the data packets to classifier 450 for scheduling the transmission of the data packets out of communication link 406. Unlike TCP, protocols such as UDP do not provide congestion control, and therefore cannot provide any congestion indication to rate-estimating congestion controller 412 of QoS engine 410. Therefore, congestion control for protocols such as UDP cannot be performed on individual connection basis, but instead can be performed by using estimated connection rates of other protocols that provide congestion control. Details will be described below.

Classifier 450 can classify data packets 436A and 436B as corresponding to one or more connections and applications, and can provide classification information 452 to QoS engine 410. Classification information 452 can be provided as part of data packets 436A and 436B by in-band classification applications. For some embodiments, the classification information, such as classification information 452, is further described in application Ser. No. 13/969,440, which is hereby incorporated by reference. In some embodiments, by classifying data packets 436A and 436B, classifier 450 can provide classification information 452 including, among other things, one or more identifications of connections. As an example, classifier 450 can classify, for example, data packets 436A and 436B as corresponding to a plurality of TCP connections and a plurality of UDP connections. As another example, classifier 450 can identify a plurality of data packets as corresponding to a same TCP connection. In some embodiments, classifier 450 can classify data packets 436A and 436B by using subnets. For example, if one or more data packet 436A has a common, identical, most-significant bit-group in their IP addresses, they can be classified as corresponding to a same connection. Classifier 450 can also identify, from data packets 436A and 436B, information such as application names, payloads, and one or more flags in the header section of the data packets.

Moreover, classifier 450 can also provide classification information 452 obtained from any other devices of appliance 108, such as a policy engine (not show). Classification information 452 can include information such as one or more identifications of service classes (e.g., a TCP service class, a UDP service class), priorities associated with the one or more service classes, one or more identifications of sub-classes, priorities associated with the one or more sub-classes, one or more identifications of connections, and association of the one or more connections with the one or more service classes or sub-classes. It is appreciated that classifier 450 can be any kind of connection or application classifier. After classifying data packets 436A and/or 436B, classifier 450 can provide classification information 452 to QoS engine 410 and can also forward data packets 446 or information about data packets to QoS engine 410. In some embodiments, the classification information 452 can be provided as part of data packets 456 or information about data packets.

In some embodiments, classifier 450 can construct the classification tree, such as classification tree 900 described below. Classifier 450, can receive and analyze network traffic as corresponding to one or more connections and applications, and construct or revise the classification tree. It is appreciated that classifier 450 and other classifiers (not shown) can access the classification tree from a central location, in memory 222, storage 228, and/or memory/storage associated with network interfaces 218. In some other embodiments, classifier 450 and other classifiers (not shown) can maintain separate copies of the classification tree, in separate memories, storage devices, and/or memory/storage devices associated with one or more network interfaces.

In some embodiments, QoS engine 410 can also construct or update a classification tree. QoS engine 410 can also maintain a copy of the classification tree that classifier 450 construct. The classification tree can be implemented, in part, by using the H-WF2Q+ algorithm or some other algorithms. It is appreciated that the classification tree can be stored in a central location, in memory 222, storage 228, and/or memory/storage associated with network interfaces 218, allowing QoS engine 410 and classifier 450 to access it. It is also appreciated that QoS engine 410 and classifier 450 can have separate copies of the classification tree, in separate memories, storage devices, and/or memory/storage devices associated with one or more network interfaces.

QoS engine 410 can include a rate-estimating congestion controller 412 and a link-rate based sender 415, for scheduling data packets. In some embodiments, rate-estimating congestion controller 412 and link-rate based sender 415 can be physically or functionally combined or integrated.

Rate-estimating congestion controller 412 can receive classification information 442 from classifier 450. As described above, rate-estimating congestion controller 412 can also receive one or more congestion indications from a plurality of connections of communication link 406, such as one or more TCP connections 420A-N. Rate-estimating congestion controller 412 can determine whether at least one of the plurality of connections does not provide congestion indication. As an example, if a connection is a TCP connection, its congestion indications are likely available because a TCP connection provides congestion control. On the other hand, if a connection is a UDP connection, its congestion indication are likely unavailable because a UDP connection does not provide congestion control.

In some embodiments, when rate-estimating congestion controller 412 receives one or more congestion indications, it can estimate a rate, e.g., a bandwidth, of the connection based on the one or more congestion indications. Rate-estimating congestion controller 412 can estimate a rate of a connection by using, for example, the TCP-Vegas protocol, the Westwood protocol, and the UDT-based data transfer protocols. As an example, in the TCP-Vegas protocol, delay of the data packets, e.g., round-trip time (RTT) values, is used as a signal to determine the rate at which the data packets are transmitted. It is appreciated that rate-estimating congestion controller 412 can use any TCP congestion avoidance algorithms or protocols to estimate the rate of a connection, based on any congestion indications such as loss of packets, delay of packets, RTT, lack of ACK, and duplicated ACK.

As described above, some connections, e.g., UDP connections, do not provide congestion control and thus congestion indications corresponding to these connections may not be available. Rate-estimating congestion controller 412 can estimate the rate of those connections based on the rates of connections that are can be estimated. As an example, rate-estimating congestion controller 412 can first estimate the rate of a TCP connection using any of the TCP congestion avoidance algorithms or protocols as described above.

After the rate of the TCP connection is estimated, rate-estimating congestion controller 412 can then estimate a rate of a UDP connection using the estimated rate of the TCP connection. For example, based on empirical data of a particular communication link, a rate-estimating congestion controller 412 can estimate that the rate of a UDP connection is double the rate of the TCP connection. In other words, a rate of a connection that does not provide congestion control and that does not provide any congestion indication, can nevertheless be estimated based on extrapolation of the estimate rate of the one or more connections providing congestion control. It is appreciated that any rate estimation or extrapolation algorithms or protocols can be used to estimate rates of connections that do not provide congestion indications.

In some embodiments, rate-estimating congestion controller 412 can estimate rates of one or more connections of a communication link. For example, rate-estimating congestion controller 412 can estimate each connection in the communication link. After rate-estimating congestion controller 412 estimates the rate of each connection of the communication link, it can then determine the link rate of the communication link. As an example, rate-estimating congestion controller 412 can determine that in a communication link, there are 4 unique TCP connections, 2 unique FTP connections, and 3 unique UDP connections. The link rate thus can be determined as the sum of the rate of each of the TCP, FTP, and UDP connections. One of ordinary skill in the art would appreciate that the link rate can also be determined in any other manner that is desired.

After rate-estimating congestion controller 412 determines the link rate of a communication link, it can send a link rate update 414, which comprises the estimated link rate, to a link-rate based sender 415. Link-rate based sender 415 can schedule the data packets according to the estimated link rate. As an example, link-rate based sender 415 can schedule the data packets by using a classification tree, such as classification tree 900 of FIG. 9, which will be described in detail below. Link-rate based sender 415 can also maintain queues, such as packet scheduling queues for one or more connections, such as one queue for each connection, and store data packets in the corresponding queues. In some embodiments, if queues are full, link-rate based sender 415 can either update the corresponding connections to slow down or drop data packets. As an example, for a connection that provides receive window control (e.g. a TCP connection), link-rate based sender 415 can update the connection to reflect the connection's buffered packets in the receive window size advertised to the sender, resulting in a reduction of the receive window size so that the remote sender will slow down or stop transmitting more data packets. As another example, for a connection that does not provide congestion control (e.g., a UDP or ICMP connection), link-rate based sender 415 can drop data packets. After link-rate based sender 415 schedules the data packets, it can transmit the data packets, e.g., data packets 466, to traffic controller 440, which can forward the data packets to corresponding remote receivers via any communication protocol.

QoS engine 410 can also update one or more connections that provide congestion control, e.g., TCP connections 420A-N, according to the scheduling of the data packets. For example, if link-rate based sender 415 schedules data packets of TCP connection 420A to have low priority (thus lower bandwidth), it can update receiver 422 to adjust the receive window size to account for the packets that are queued in the connection queues of link-rate based sender 415. By adjusting the receive window size, a remote sender can, for example, slow down or stop sending data packets to TCP connection 420A.

Figure 5:
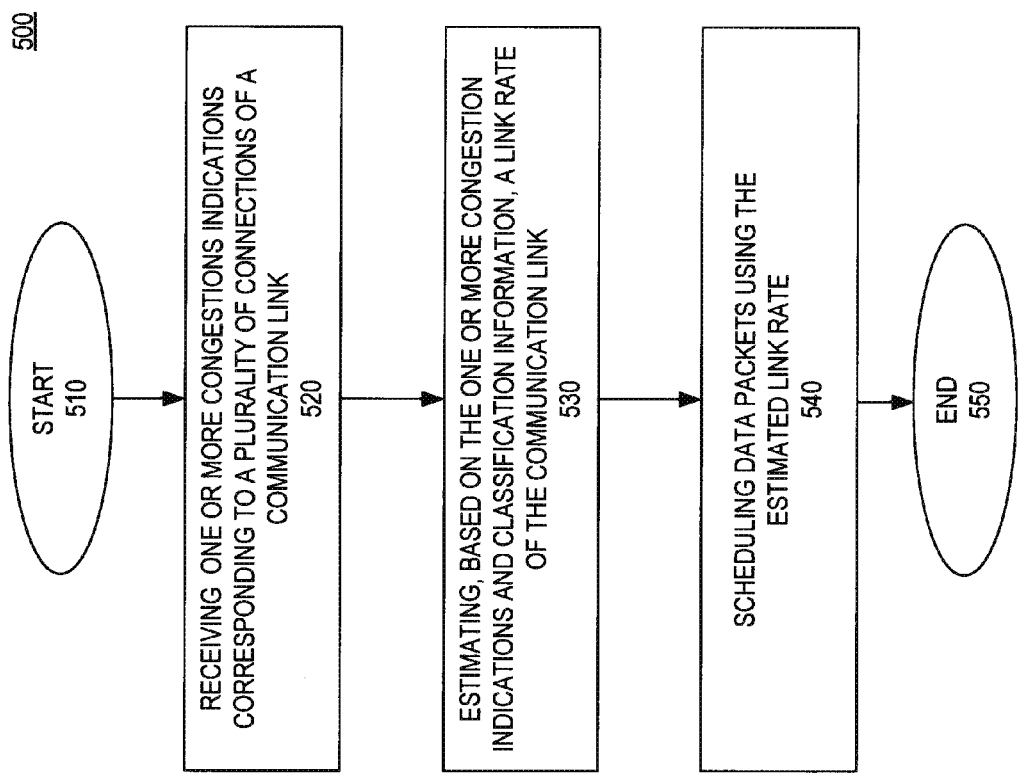
FIG. 5 is a flowchart representing an exemplary method of scheduling data packets.

FIG. 5 is a flowchart representing an exemplary method 500 of scheduling data packets. It will be readily appreciated that the illustrated procedure can be altered to delete steps or further include additional steps. After initial step 510, a packer scheduler, such as QoS engine 410, receives (520) one or more congestion indications corresponding to a plurality of connections of a communication link. The communication link, for example, can include one or more TCP connections, one or more UDP connections, etc. The one or more congestion indications can include, for example, indication of dropped packets, indications of delayed packets, indications of corrupted packets, and explicit congestion indications. The one or more congestion indications can be provided by the one or more packet engines, such as packet engines that can process data packets of TCP connections (e.g., TCP connections 420A-N) or UDP/ICMP connections (e.g., UDP/ICMP connections 430). In some embodiments, the communication link can include at least one connection, such as TCP connection 420A, that provides congestion control, and therefore provides one or more congestion indications.

After receiving the one or more congestion indications, the packet scheduler can estimate (530), based on the one or more congestion indications and classification information, a link rate of the communication link. The packet scheduler can perform the estimation by using rate-estimating congestion controller (e.g., rate-estimating congestion controller 412). The classification information can be provided by a classifier, such as classifier 450. The classification information can include information such as one or more identifications of service classes (e.g., a TCP service class, a UDP service class), priorities associated with the one or more service classes, one or more identifications of sub-classes, priorities associated with the one or more sub-classes, one or more identifications of connections, and association of the one or more connections with the one or more service classes or sub-classes. The link rate information can indicate, for example, the bandwidth of the communication link between two endpoints (for example, a link between a main office in Washington, D.C., and a branch office in Palo Alto, Calif.). The link rate can correspond to connection rates of the plurality of connections. For example, the packet scheduler can estimate connection rates of one or more connections in the communication link using their respective congestion conditions, and then estimate the link rate using the estimated connection rates. Details of the estimating the link rate of the communication link will be further described below.

After estimating the link rate, the packet scheduler can schedule (540) the data packets using the estimated link rate. In some embodiments, the packet scheduler can schedule the data packets using a link-rate based sender (e.g., link-rate based sender). Moreover, the packet scheduler can schedule the data packets in a packet scheduling process using a classification tree (e.g., classification tree 900 of FIG. 9). In some embodiments, the packet scheduler can use the classification tree to prioritize, schedule, and process data packets according to defined policy of network traffic optimization and a classification of network connections. Such classification trees can be based off the Hierarchical Packet Fair Queuing (H-PFQ) algorithm, the Hierarchical Worst-case Fair Weighted Fair Queuing (H-WF$^2$Q), the H-WF$^2$Q+ algorithm, or a variation thereof. The implementation of the classification tree can be a data structure constructed in any language, some of which include C++, Boost C++, Java, Python, PHP, Perl, Apple Core Foundation library, Go library, etc. It is appreciated that the classification tree can be implemented in firmware source code, hardware source code, or a combination of software source code, firmware source code, and/or hardware source code. The details of the packet scheduling process and the use of an exemplary classification tree will be further described below. After step 540, process 500 can proceed to an end 550. Process 500 can also be repeated to schedule more data packets that are received at the one or more packet engines.

Figure 6:
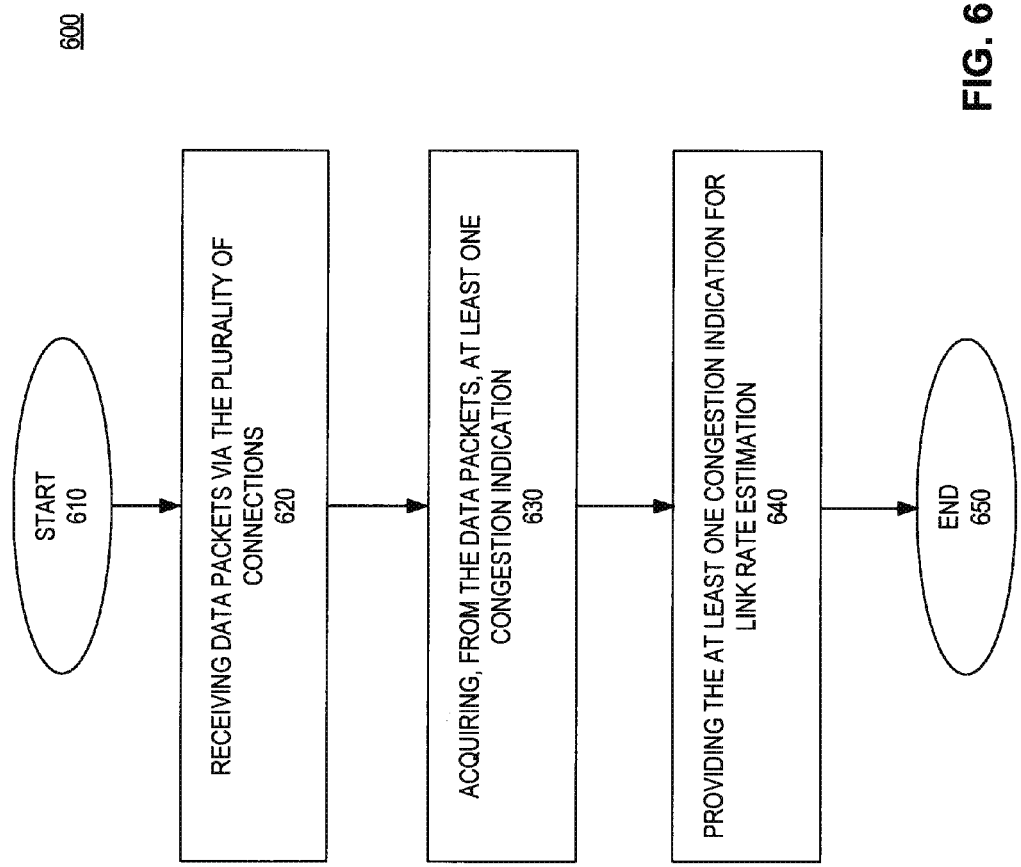
FIG. 6 is a flowchart representing an exemplary method of providing congestion indications for link rate estimation as illustrated in FIG. 5.

FIG. 6 is a flowchart representing an exemplary method 600 of providing congestion indications of a communication link as illustrated in FIG. 5. It will be readily appreciated that the illustrated procedure can be altered to delete steps or further include additional steps. After initial step 610, one or more packet engines can receive (620) data packets, such as data packets 435A and 435B, via a plurality of connections, such as one or more TCP connections 420A-N and UDP/ICMP connections 430. The one or more packet engines can have one or more packet engine queues that store the data packets received. For example, each packet engine can have its own packet engine queue. As described above, a packet engine can receive one or more data packets from a same connection (e.g., a TCP connection), or different connections (e.g., a TCP connection and a UDP connection). The packet engine can store the received data packets from either the same or different connections in its own packet engine queue.

After receiving data packets, the one or more packet engines can acquire (630), from the data packets, at least one congestion indication. The one or more packet engines can obtain the one or more congestion indications by using, for example, a congestion controller, such as congestion controller 426. A data packet received via a connection corresponding to a protocol that provides congestion control can include congestion indications. For example, data packets received via a TCP connection can include a TCP segment that comprises congestion indications. On the other hand, a data packet received via a connection corresponding to a protocol that does not provide congestion control may not include any congestion indication. For example, data packets received via a UDP connection may not comprise any congestion indication.

As described above, congestion indications can comprise any notification that communicates network congestion or allows an inference of potential network congestion to be drawn. Congestion indications can include, for example, indication of dropped packets, indications of delayed packets, indications of corrupted packets, and explicit congestion indications. In a TCP connection, for example, congestions may be indicated in TCP segments comprising duplicate acknowledgements (ACKs) or lack of ACKs, and TCP segments comprising marketed ECN flags.

After acquiring one or more congestion indications, the one or more packet engines can provide (640) the at least one congestion indication to the packet scheduler, such as QoS engine 410, for link rate estimation. In some embodiments, the one or more packet engines provide data packets that need to be scheduled to the classifier, such as classifier 450, for classification. As described above, the classifier can provide classification information such as one or more identifications of service classes (e.g., TCP service class, UDP service class), priorities associated with the one or more service classes, one or more identifications of sub-classes, priorities associated with the one or more sub-classes, one or more identifications of connections (e.g., a TCP connection, a UDP connection), and association of the one or more connections with the one or more service classes or sub-classes. In other embodiments, the data packets can be provided to the packet scheduler directly.

After step 640, process 600 can proceed to an end 650. Process 500 can also be repeated after more data packets are received at the one or more packet engines.

Figure 7:
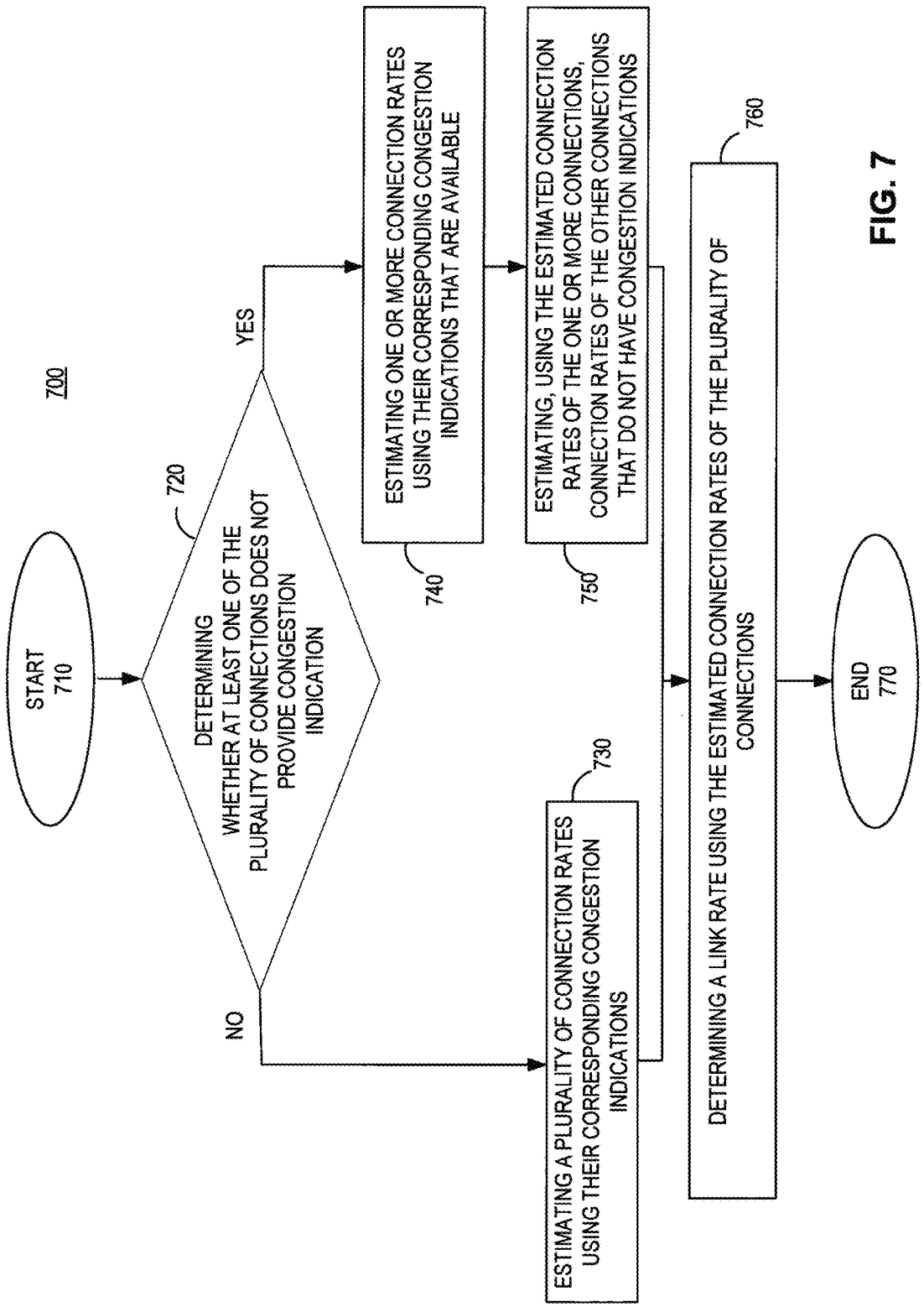
FIG. 7 is a flowchart representing an exemplary method of estimating a link rate of a communication link as illustrated in FIG. 5.

FIG. 7 is a flowchart representing an exemplary method 700 for estimating a link rate of a communication link based on the one or more congestion indications and classification information, as illustrated in FIG. 5. It will be readily appreciated that the illustrated procedure can be altered to delete steps or further include additional steps.

After initial step 710 a packet scheduler, such as QoS engine 410, can determine (720), based on the classification information, whether at least one of the plurality of connections does not provide congestion indication. As described above, the classifier can provide classification information to the packet scheduler. Classification information can include, among other things, identifications of connections (e.g., TCP connections 420A-N, UDP/IMCP connections 430, etc.). Moreover, the packet scheduler can also receive one or more congestion indications from the one or more packet engines processing the data packets of the plurality of connections. Therefore, the packet scheduler can determine, for example, whether each connection provided in the classification information has its corresponding congestion indications. As described above, some of the connections, such as a UDP connection, may not provide congestion control and therefore does not have corresponding congestion indications. Therefore, based on the classification information, the packet scheduler can determine, for example, whether all of the plurality of connections in the communication link provide congestion indications, or whether at least one of the plurality of connections does not provide any congestion indication.

If the packet scheduler determines that each connection in the communication link provides corresponding congestion indications, the packet scheduler can estimate (730) one or more connection rates using the corresponding congestion indications. For example, the packet scheduler, through a rate-estimating congestion controller (e.g., rate-estimating congestion controller 412), can estimate a rate of a connection by using TCP-Vegas, Westwood, and UDT-based data transfer protocols. As described above, in TCP-Vegas algorithm, delay of the data packets, e.g., Round-Trip Time (RTT) values, is used as a signal to determine the rate at which the data packets are sent. It is appreciated that any TCP congestion avoidance algorithms or any other method can be used to estimate the rate of a connection, which can use any congestion indications such as loss of packets, delay of packets, RTT, lack of ACK, and duplicated ACKs.

If the packet scheduler determines that at least one of the plurality of connections does not provide any congestion indication, the packet scheduler can first estimate (740) one or more connection rates using the corresponding congestion indications that are available. As an example, if the classification information provides that the communication links comprises a TCP connection and a UDP connection, the packet scheduler can determine that the TCP connection provides congestion indications, but the UDP connection does not. The packet scheduler can then first estimate the connection rate of the TCP connection by using the congestion indications provided by the TCP connection.

After the packet scheduler estimates one or more connection rates using the corresponding congestion indications that are available, the packet scheduler can estimate (750) one or more connection rates corresponding to at least one connection that does not provide congestion indication, using the estimated one or more connection rates corresponding to the one or more of the plurality of connections that provide congestion indications. In the above example, when the packet scheduler estimates the connection rate of the TCP connection, it can use the estimated TCP connection rate to estimate the connection rate of the UDP connection. For example, if the TCP connection rate is estimated to be 500 Mbps, the UDP connection rate may be estimated, such as extrapolated based on past empirical data, to be 1 Gbps.

After estimating the one or more connection rates of the plurality of connections of in the communication link, the packet scheduler can determine (760) a link rate using the estimated one or more connection rates. As an example, the packet scheduler, through the rate-estimating congestion controller, can determine that there are total of 4 unique TCP connections, 2 unique FTP connections, and 3 unique UDP connections. The link rate thus can be determined as the sum of the estimated connection rates of each of the TCP, FTP, and UDP connections. In some embodiments, the link rate can be determined by using one or more of the header section of a TCP segment of a TCP/IP data packet, the Layer 2 (L2) overhead, and the tunneling overhead. The L2 overhead can include the overhead of the MAC header, and can also include the Virtual Local Area Network (VLAN) tag. The tunneling overhead can depend on the tunneling technique that is applied, such as GRE, IPSEC or GRE/IPSEC. The L2 overhead and the tunneling overhead can be configured on a per link basis and can be applied in a different manner for different communication links. The link rate can also be determined in any other manner that is desired. After step 760, process 700 can proceed to an end 770.

Figure 8:
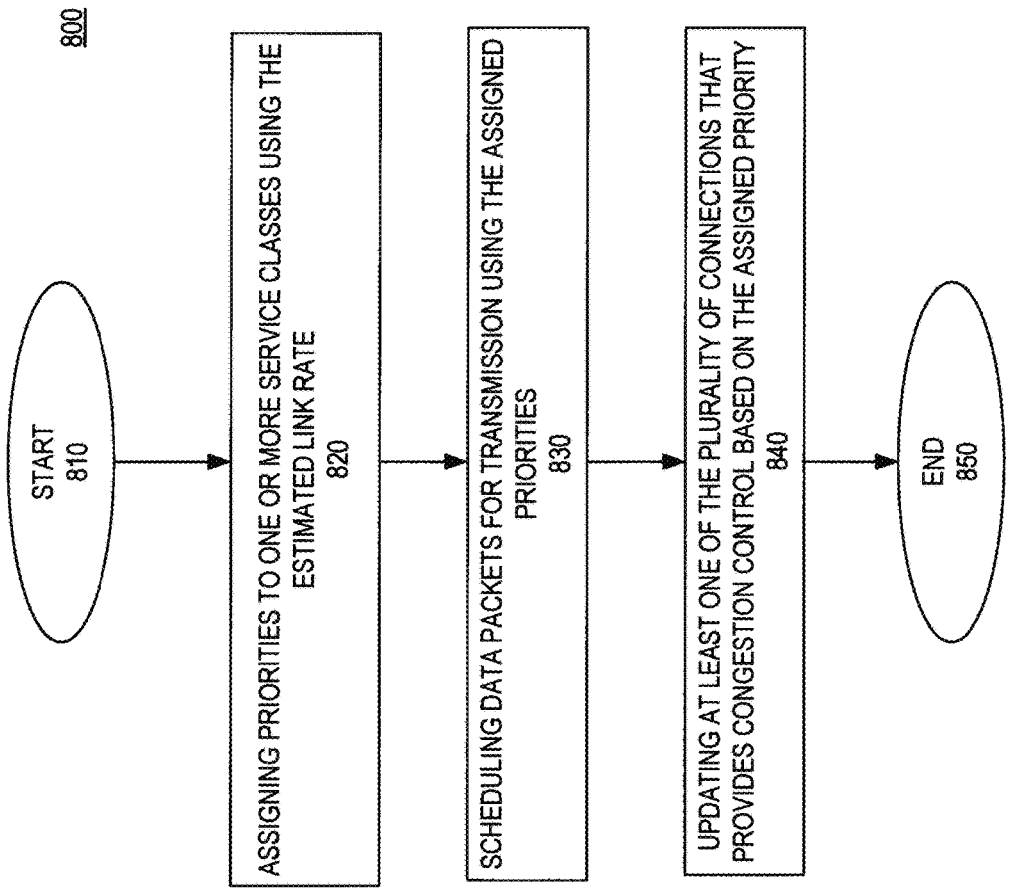
FIG. 8 is a flowchart representing an exemplary method of scheduling data packets using the estimated link rate as illustrated in FIG. 5.

FIG. 8 is a flowchart representing an exemplary method 800 for scheduling data packets using the estimated link rate and classification information, as illustrated in FIG. 5. It will be readily appreciated that the illustrated procedure can be altered to delete steps or further include additional steps. After initial step 810, a packet scheduler (e.g., QoS engine 410) can assign or allocate (820) priorities to one or more service classes, and/or sub-classes, using the estimated link rate. The plurality of connections under each service class or sub-class can share the assigned or allocated priorities (e.g. bandwidth). In some embodiments, the packet scheduler can assign or allocate priorities to one or more service classes, and/or sub-classes using a classification tree, such as classification tree 900.

Figure 9:
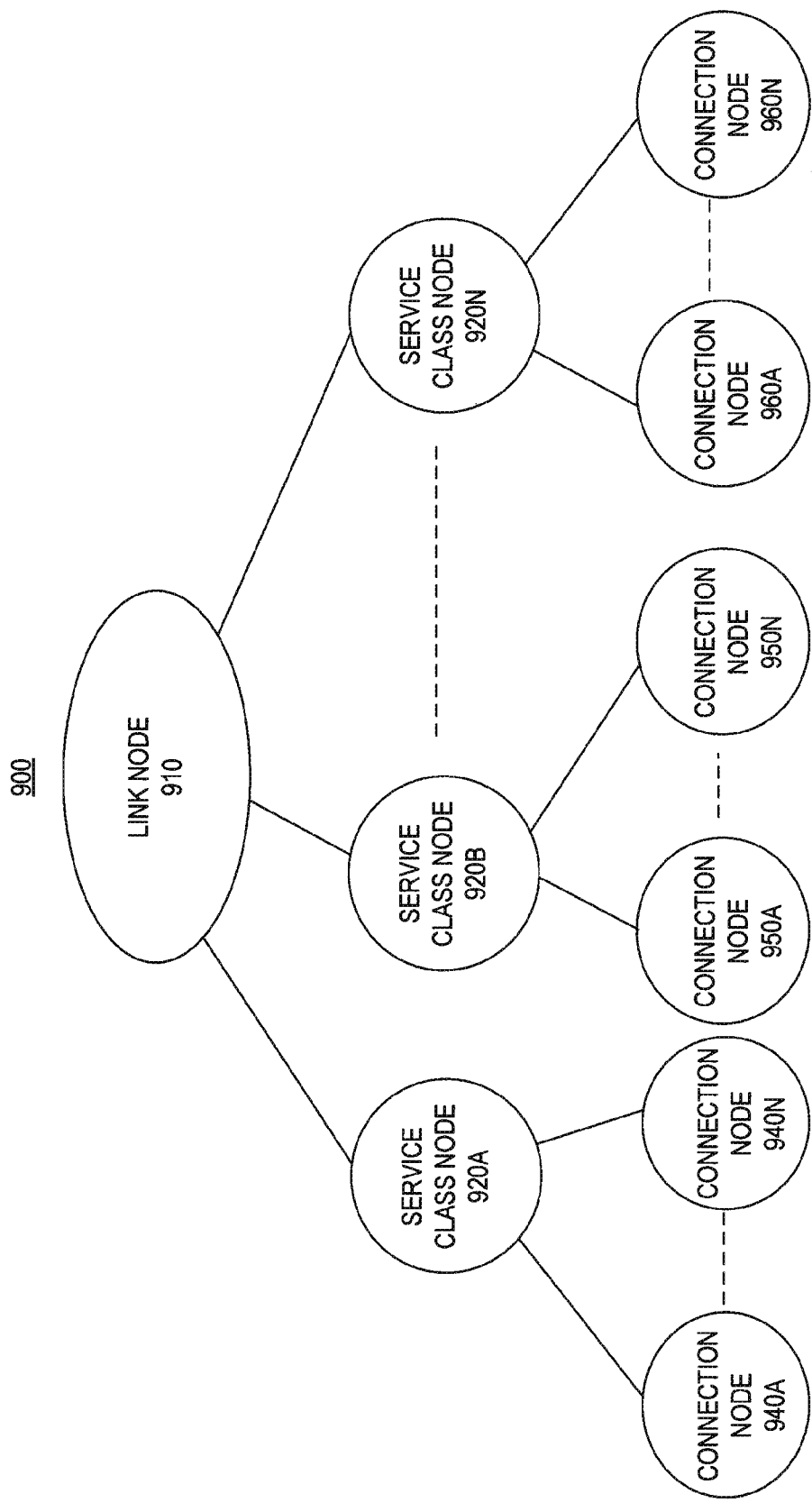
FIG. 9 is a diagram of an exemplary classification tree, consistent with embodiments of the present disclosure.

As shown in FIG. 9, classification tree 900 can be, for example, an H-WF$^2$Q+ tree for establishing priorities of connections corresponding to the data packets. Classification tree 900 can include a link node 910, one or more service class nodes 920A-N, and one or more connection nodes 940A-N, 950A-N, and 960A-N. Link node 910 can be implemented using one or more source code modules alone or in combination with one or more data structures (referencing its descendent nodes), all of which can be stored in memory 222, storage 228, and/or memory/storage associated with network interface 218. Link node 910 can be connected to one or more services nodes 920A-N, each of which can in turn be connected to one or more connection nodes 940A-N, 950A-N, or 960A-N. In some embodiments, one or more service sub-class nodes (not shown) can exist between a service class node (e.g., service class node 920A) and connection nodes (e.g., connection nodes 940A-N). Therefore, classification tree 900 can have more than 3 levels of hierarchy as shown in FIG. 9. Each internal node (i.e., service-class, sub-service-class, and service-class connection nodes) can represent a logical queue. The packet scheduler, such as QoS engine 410, can use these logical queues as a building block to organize how packets will be scheduled for transmission, based on the service classes and priority of these service classes in the classification tree. The organization of link node 910 and service class nodes 920A-N can be implemented using a classification algorithm, such as the WF$^2$Q+ queuing algorithm into a hierarchical structure like the upper nodes of classification tree 900 can be implemented using the H-WF$^2$Q+ algorithm. The packet scheduler can prioritize the transmission of packets using the algorithm mentioned above by storing pending packets in one or more shared memory pools encompassing all of memory 222 or some portion thereof. Several single read single write queues can be created using memory 222.

Using the estimated link rate, the packet scheduler can assign (820) the estimated link rate to, for example, link node 910 in the classification tree 900. As described above, the classifier can also provide classification information including, among other things, one or more identifications of service classes (e.g., TCP service class, UDP service class), priorities associated with the one or more service classes, one or more identifications of sub-classes, and priorities associated with the one or more sub-classes. Using the classification information, the packet scheduler can establish or update the classification tree, such as classification tree 900.

For example, in FIG. 9, the packet scheduler can assign service class node 920A to represent a UDP service class having a priority of 1; assign service class node 920B to represent an FTP service class having a priority of 3; and assign service class node 920N to represent a TCP service class having a priority of 8. In some embodiments, a priority with a higher number represents a higher priority such that the data packets corresponding to connections of that service class can share a higher bandwidth than data packets corresponding to connections of other service classes. In the above example, the TCP service class has the highest priority and can be assigned, e.g., a bandwidth of 2.666 Gbps out of the total 4 Gbps bandwidth that is available on the communication link. On the other hand, the FTP service class has a higher priority than the UDP service class, but lower priority than the TCP service class. The FTP service class can be assigned, e.g., a bandwidth of 1 Gbps. Finally, the UDP service class has the lowest priority and can be assigned, e.g., the remaining bandwidth of 333 Mbps. The total bandwidth assigned to service class nodes 920A-N cannot exceed the available bandwidth of the communication link, i.e., the estimated link rate.

Moreover, if the estimated link rate changes from 4 Gbps to 3 Gbps, then the available bandwidths for each service class can be adjusted accordingly. For example, the TCP service class can have a bandwidth of 2 Gbps instead of 2.666 Gbps, while the FTP and UDP service classes can have bandwidths of 750 and 250 Mbps, respectively.

The classifier can also provide classification information including, among other things, one or more identifications of connections and association of the one or more connections with the one or more service classes or sub-classes. As shown in FIG. 9, one or more connection nodes (e.g. 940A-N, 950A-N, and 960A-N) corresponding to the plurality of connections can be created under the service class nodes 920A-N. Each of the connection nodes can thus represent a different connection via the communication link. As an example, as described above, service class node 920A can represent a UDP service class. If, for example, there are total of 3 different UDP connections under service class node 920A, then three connection nodes (e.g., 940A-C) can be created under service node 920A. The three UDP connections correspond to three connections of a communication link. In some embodiments, the packet scheduler can also create and maintain a connection table, which can include all connection nodes corresponding to different connections.

After the packet scheduler establishes or updates the classification tree, such as classification tree 400, using the estimated link rate and the classification information, the number of connection nodes under each of the service class nodes, such as service class nodes 920A-N, can be determined. And the connections under each service class nodes can share the assigned or allocated priority (e.g. bandwidth) of the corresponding service class in a desired manner. For example, in classification tree 900, if service class node 920A is assigned a lowest priority and a bandwidth of 333 Mbps, and if there are total of three UDP connection nodes under service class node 920A, each of the three connection nodes can have a bandwidth of 111 Mbps (i.e., 333 Mbps/3) if the bandwidth of the service class is equally shared among all connections of the service class. Similarly, other connection nodes in classification tree 900 can also share priorities (e.g. bandwidth) of the corresponding service class nodes in a desired manner. Assigning or allocating of the priorities of the one or more service classes, which shares priorities among their corresponding connections, is thus performed with respect to all connections in the communication link, rather than with respect to each individual connection. It is appreciated that classification tree 900 can also have more than 3 levels of hierarchy as shown in FIG. 9; and can have any number of service class nodes and connection nodes. Moreover, the bandwidth shared among connection nodes may or may not equal to each other and can have any desired bandwidth.

Referring to FIG. 8, after assigning priorities to the plurality of connections using the estimated rate and the classification information, the packet scheduler can schedule (830) data packets for transmission using the assigned or allocated priorities. In some embodiments, the classifier, such as classifier 450, can forward data packets corresponding the plurality of connections to the packet scheduler, and the packet scheduler can maintain queues, such as one or more packet scheduling queues, to store the data packets. As an example, the packet scheduler can maintain a queue for each connection and store the data packets (or information about each data packet) of each connection in the corresponding queue. Using the assigned priority, the packet scheduler can schedule the data packets for transmission stored at the packet scheduling queues. For example, if a data packet corresponding to a time-sensitive VoIP connection is assigned a high priority, the packet scheduler can schedule the data packet to transmit immediately, regardless of whether the VoIP connection provides many congestion indications.

After scheduling the data packets for transmission, the packet scheduler, such as through a link-rate based sender (e.g., link-rate based sender 415, can transmit or drop (not shown) the data packet according to the scheduling. After scheduling the data packets for transmission, the packet scheduler can also update (840) at least one of the plurality of connections that provides congestion control based on the assigned priority. For example, if the packet scheduler assigns a low priority (e.g., low bandwidth) to a service class including a particular TCP connection, such as TCP connection 320A, it can update the receiver, such as receiver 322, to adjust the receive window size (e.g., reduce the buffering of data packets) to account for the packets that are queued in the connection queues of the link-rate based sender, and thus inform the remote sender to for example, slow down or stop the transmission of one or more data packets. After step 840, process 800 can proceed to an end 850.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A system for scheduling data packets, the system comprising:
    one or more packet engines configured to provide one or more congestion indications for a plurality of connections corresponding to a communication link; and
    a packet scheduler configured to:
        receive the one or more congestion indications,
        determine, based on classification information, whether at least one of the plurality of connections does not provide congestion indication,
        in response to the determination, estimate a link rate of the communication link using the one or more congestion indications and the classification information, and
        schedule the data packets for transmission via the plurality of connections using the estimated link rate and the classification information.

2. The system of claim 1, further comprising a classifier configured to provide the classification information by classifying the data packets corresponding to the plurality of connections.

3. The system of claim 1, wherein the classification information includes at least one of one or more identifications of service classes, priorities associated with the one or more service classes, one or more identifications of subclasses, priorities associated with the one or more subclasses, one or more identifications of connections, and association of the one or more connections with the one or more service classes or sub-classes.

4. The system of claim 1, wherein the one or more packet engines are configured to provide one or more congestion indications corresponding to the communication link further comprises the one or more packet engines to:
    receive the data packets via the plurality of connections;
    acquire, from the data packets, the one or more congestion indications; and
    provide the one or more congestion indications for link rate estimation.

5. The system of claim 4, wherein the one or more packet engines are further configured to send the data packets to a classifier for classification.

6. The system of claim 1, wherein the packet scheduler is configured to estimate the link rate of the communication link further comprises the packet scheduler to:
    estimate a plurality of connection rates of the plurality of connections based on the determination of whether at least one of the plurality of connections does not provide congestion indication; and
    determine the link rate using the estimated one or more connection rates.

7. The system of claim 6, wherein the packet scheduler estimates a plurality of connection rates of the plurality of connections based on the determination further comprises the packet scheduler to:
    estimate one or more connection rates corresponding to one or more of the plurality of connections that provide one or more congestion indications; and
    if at least one of the plurality of connection does not provide congestion indication, estimate one or more connection rates corresponding to the at least one of the plurality of connections that does not provide congestion indication based on the use of the estimated one or more connection rates corresponding to the one or more of the plurality of connections that provide one or more congestion indications.

8. The system of claim 1, wherein the packet scheduler is configured to schedule the data packets further comprises the packet scheduler to:
    assign priorities to one or more service classes using the estimated link rate and the classification information, wherein the priorities of the one or more service classes are shared by one or more connections corresponding to each service class;
    schedule data packets for transmission using the assigned priorities; and
    update one or more connections of the plurality of connections that provide the one or more congestion conditions.

9. The system of claim 8, wherein the assignment of priorities to the one or more service classes comprises the packet scheduler to assign priorities using a classification tree.

10. The system of claim 1, wherein the plurality of connections include at least one transport control protocol (TCP) connection.

11. A method for scheduling data packets, the method being performed by one or more processors and comprising:
receiving one or more congestion indications for a plurality of connections corresponding to a communication link;
determining, based on classification information, whether at least one of the plurality of connections does not provide congestion indication,
in response to the determination, estimating a link rate of the communication link using the one or more congestion indications and the classification information; and
scheduling the data packets for transmission via the plurality of connections using the estimated link rate and the classification information.

12. The method of claim 11, wherein the classification information includes at least one of one or more identifications of service classes, priorities associated with the one or more service classes, one or more identifications of sub-classes, priorities associated with the one or more sub-classes, one or more identifications of connections, and association of the one or more connections with the one or more service classes or sub-classes.

13. The method of claim 11, wherein estimating a link rate of the communication link using the one or more congestion indications and classification information comprises:
estimating a plurality of connection rates of the plurality of connections based on the determination of whether at least one of the plurality of connections does not provide congestion indication; and
determining the link rate using the estimated one or more connection rates.

14. The method of claim 13, wherein estimating the plurality of connection rates of the plurality of connections based on the determination further comprises:
estimating one or more connection rates corresponding to one or more of the plurality of connections that provide one or more congestion indications; and
if at least one of the plurality of connection does not provide congestion indication, estimating one or more connection rates corresponding to the at least one of the plurality of connections that does not provide congestion indication based on the use of the estimated one or more connection rates corresponding to the one or more of the plurality of connections that provide one or more congestion indications.

15. The method of claim 11, wherein scheduling the data packets for transmission via the plurality of connections using the estimated link rate and the classification information comprises:
assigning priorities to one or more service classes using the estimated link rate and the classification information, wherein the priorities of the one or more service classes are shared by one or more connections corresponding to each service class;
scheduling data packets for transmission using the assigned priorities; and
updating one or more connections of the plurality of connections that provide the one or more congestion conditions.

16. The method of claim 15, wherein the assignment of priorities to the one or more service classes comprises assigning, at the packet scheduler, priorities using a classification tree.

17. The method of claim 11, wherein the plurality of connections include at least one transport control protocol (TCP) connection.

18. A non-transitory computer readable storage medium storing instructions that, when executed by a computer, cause the computer to perform a method for scheduling data packets, the method comprising:
receiving one or more congestion indications for a plurality of connections corresponding to a communication link;
determining, based on classification information, whether at least one of the plurality of connections does not provide congestion indication,
in response to the determination, estimating a link rate of the communication link using the one or more congestion indications and the classification information; and
scheduling the data packets for transmission via the plurality of connections using the estimated link rate and the classification information.

19. The computer readable medium of claim 18, wherein the estimation of a link rate of the communication link using the one or more congestion indications and classification information comprises:
estimating a plurality of connection rates of the plurality of connections based on the determination of whether at least one of the plurality of connections does not provide congestion indication; and
determining the link rate using the estimated one or more connection rates.

20. The computer readable medium of claim 19, wherein the estimation of a plurality of connection rates of the plurality of connections based on the determination further comprises:
estimating one or more connection rates corresponding to one or more of the plurality of connections that provide one or more congestion indications; and
if at least one of the plurality of connection does not provide congestion indication, estimating one or more connection rates corresponding to the at least one of the plurality of connections that does not provide congestion indication based on the use of the estimated one or more connection rates corresponding to the one or more of the plurality of connections that provide one or more congestion indications.

21. The computer readable medium of claim 18, wherein the scheduling the data packets for transmission via the plurality of connections using the estimated link rate and the classification information comprises:
assigning priorities to one or more service classes using the estimated link rate and the classification information, wherein the priorities of the one or more service classes are shared by one or more connections corresponding to each service class;
scheduling data packets for transmission using the assigned priorities; and
updating one or more connections of the plurality of connections that provide the one or more congestion conditions.

* * * * *